July 20, 1954     A. M. WARN     2,684,140
ADJUSTABLE CLUTCHING MECHANISM FOR VEHICLE WHEEL HUBS
Filed May 5, 1952     2 Sheets-Sheet 1
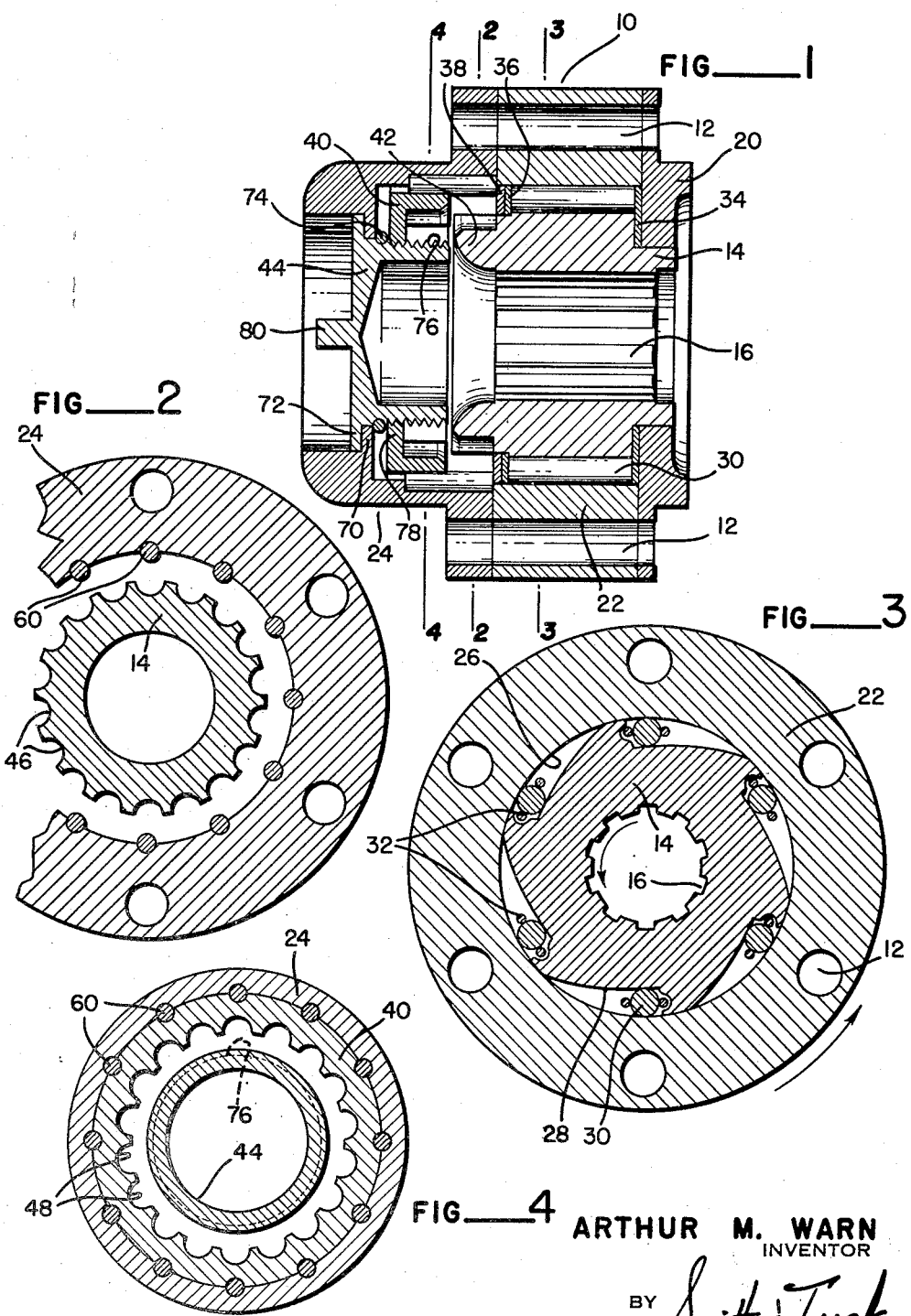
ARTHUR M. WARN
INVENTOR

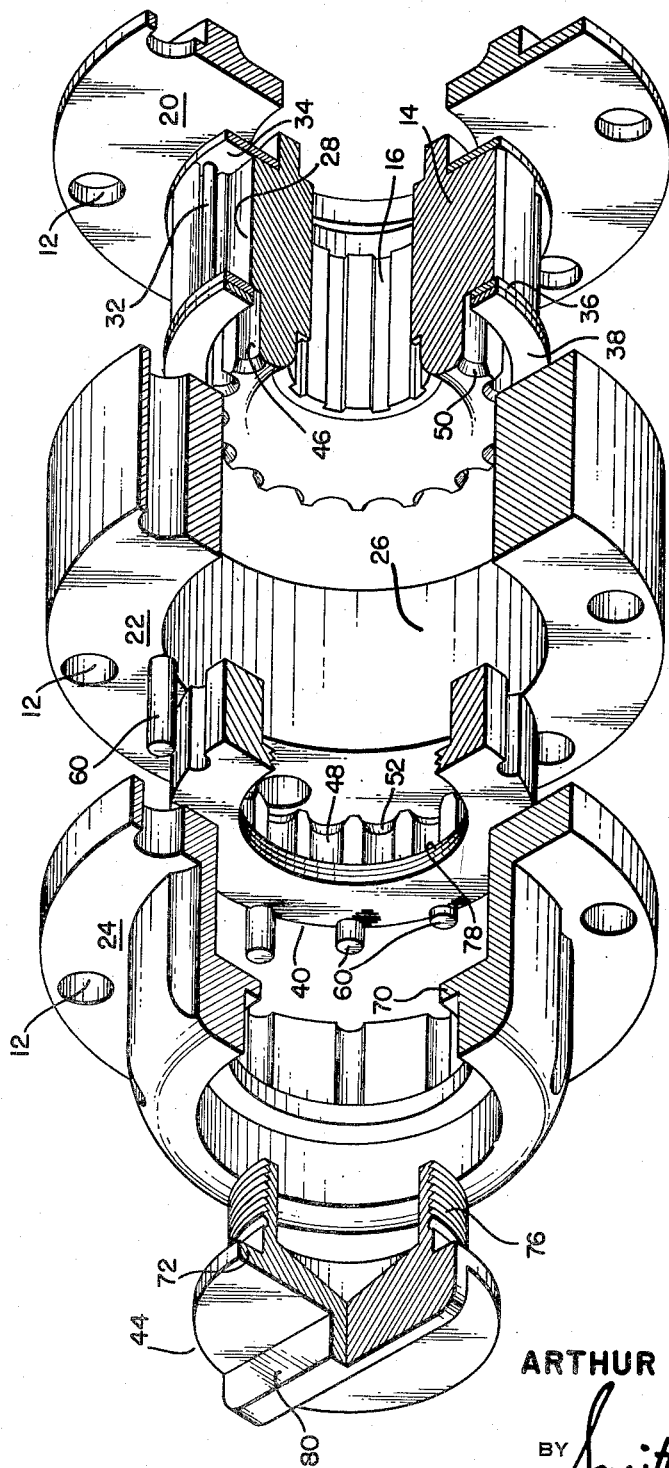

Patented July 20, 1954

2,684,140

UNITED STATES PATENT OFFICE 2,684,140

ADJUSTABLE CLUTCHING MECHANISM FOR VEHICLE WHEEL HUBS

Arthur M. Warn, Seattle, Wash.

Application May 5, 1952, Serial No. 286,064

6 Claims. (Cl. 192—48)

1

My invention relates to clutching devices, and more particularly, to an adjustable clutching mechanism for vehicle wheel hubs. This clutching mechanism is designed for vehicles having auxiliary drives on their front wheels as for instance the various well-known "jeep" type vehicles. My clutching mechanism prevents rotation of the moving parts of the front end drive except when power is applied thereto. A locking mechanism is also included which may be easily adjusted to key the clutch and housing together when it is desired to provide positive drive.

The type of four wheel drive vehicle, of which the Willys "jeep" is an example, has certain problems not found in the conventional two-wheel drive car. For driving on poor roads and in the open country and the like, the four-wheel drive is very proficient and enjoys considerable popularity with field engineers and the like. However, the owner usually wants to use the vehicle on hard surface roads where it is desirable to have only rear wheel drive. Even though power is not applied to the front wheels under such conditions, the movement by the front wheels of the front axle differential gears and drive shaft results in unnecessary loss of power and wear on the parts. To avoid this condition, a desirable feature is a clutching mechanism in the hub structure which avoids rotation of the front axles in forward movement except when power is applied to the same. This may be an unidirectional clutching mechanism employing a wedging principle. This structure, however, has limitations if it is desired to use the front drive, i. e., no power would be applied to the front wheels in reverse. For this reason, it is deemed important to provide easily adjustable means for keying the clutch to its housing when it is desired to use the vehicle in a period of rigorous conditions with the four-wheel drive.

The objects of my invention include, therefore, to design an improved clutching mechanism for a vehicle hub, to provide easily adjustable means for locking the clutch mechanism to prevent the clutching action on occasion, and to devise an economical clutching mechanism for such purposes which is easily attached to the hub assembly and requires little maintenance. Additional advantages and objectives of my invention will be best understood from a reading of the following description with reference to the drawings, in which:

Figure 1 is a view, mostly in section, taken on a plane passing through the longitudinal axis of a specific embodiment of my clutching mechanism;

2

Figure 2 is a sectional view, taken on line 2—2 of Figure 1;

Figure 3 is a sectional view, taken on line 3—3 of Figure 1;

Figure 4 is a sectional view taken on line 4—4 of Figure 1; and

Figure 5 is a perspective view of the principal parts of the clutching assembly, in exploded form, with certain parts broken away and shown in section.

Referring to Figure 1, housing 10 is securable to the outside of a vehicle wheel hub by bolt means passing through openings 12 therein. The structure shown at the left in Figure 1 being on the outside of the wheel, the same will be readily accessible to the user for purposes of adjusting the clutching mechanism, as will be hereinafter described. A clutching member 14 is disposed within housing 10 and has a splined axial opening 16 to receive and secure the wheel axle.

Housing 10 is formed of three parts; inner housing member 20, central housing member 22, and outer housing member 24. Central housing member 22 has a circular raceway 26 and clutching member 14 has clutching means for coaction with raceway 26. The clutching means includes a series of wedging surfaces 28 on clutch 14 and rollers 30. It will be understood that this structure provides unidirectional clutching. Rollers 30 are supported in position by pins 32 at either side of the same. Pins 32 are supported by ring members 34, 36, and 38 in which their ends are embedded. Ring members 34, 36 shift slightly in relation to clutch member 14 in the initiation or termination of wedging.

Referring to Figure 3, the arrow in the inside of the clutch member indicates the direction of rotation of clutch member 14 when the axle is being driven in forward movement of the vehicle. Rollers 30 acting in a wedging manner carry housing member 22 with the same. However, when power is not applied on the front axle clutch member 14 tends to remain in place while central housing member 22 moves in the direction shown by the arrow on the outside of this member in Figure 3, which will move rollers 30 out of wedging position and the housing will be free to rotate independently of the drive shaft and front axle shaft differential gears. This, of course, is the objective of the clutching structure and will be understood to save power as well as wear on the parts.

The means for locking the housing 10 and clutch member 14 include shifter locking ring 40, the key means on end portion 42 of clutch member 14, and the operating member 44. End portion 42 of clutch member 14 has disposed around its perimeter a multiplicity of keying grooves 46 and shifter member 40 is ring-shaped and has in its inner surface a multiplicity of matching parallel grooves 48. The adjacent ends of grooves 46 and 48 are beveled as at 50, 52, respectively, and the grooves fit each other loosely whereby the same may be easily interengaged even though they may not be exactly aligned. Locking ring 40 is keyed to outer housing member 24 by rods 60 embedded therebetween permitting shifting of ring 40 longitudinally of housing 10 from a first position out of contact with end portion 42 to a second position locking the same. Rods 60 also prevent relative movement between ring 40 and housing 10 about the axis of the housing.

The means for moving locking member 40 longitudinally of the housing includes operating member 44 which is positioned witin outer housing member 24. Housing member 24 and operating member 44 have abutting flanges 70 and 72 respectively and operating member 44 carries a retaining ring 74 on the inside of flange 70 whereby the operating member is free to rotate within the housing and is prevented from moving longitudinally of the same. The exterior surface of operating member 44 is provided with threads 76 coacting with threads on an interior flange 78 of locking ring 40. It will be apparent that on rotation of operating member 44, locking ring 40 moves longitudinally of the housing. Therefore, by means of manual manipulation of operating member 44 through boss 80, the clutching mechanism may be easily and rapidly moved into and out of locked position.

Having thus described my invention, I claim:

1. An adjustable clutching mechanism for four wheel drive vehicles to connect a front wheel and the front axle of said front wheel which is drivable by the vehicle engine, comprising: a housing attachable to said front wheel and a clutch member positioned in said housing and secured to said front axle; said housing and said clutch member having clutching means therebetween for moving said housing and clutch member together only when said front axle is being driven in forward movement of such vehicle; said clutch member having an annular end portion having a multiplicity of parallel grooves disposed around its perimeter; a locking shifter member having an annular opening therein having a multiplicity of parallel grooves therein engageable with said grooves of said clutch member; said locking member being slidable in said housing from a first position out of contact with said clutch member to a second position in which said grooves are interlocked, and said locking member and housing having means preventing rotation therebetween; and an operating member mounted in said housing in a manner permitting rotation and preventing longitudinal movement therebetween, said operating member and said locking member having thread means therebetween whereby, when said operating member is rotated relative said locking member, said locking member is moved from said first to said second position, said operating member being manually rotatable relative to said housing.

2. An adjustable clutching mechanism for four wheel drive vehicles to connect a front wheel and the front axle of said front wheel which is drivable by the vehicle engine, comprising: a housing attachable to said front wheel and a clutch member positioned in said housing and secured to said front axle; said housing and said clutch member having clutching means therebetween; a locking shifter member positioned at an end of said clutch member and fixed against rotation in relation to said housing; said locking member and said clutch member having interengageable tongue and groove means running longitudinally of said housing and said locking member being slidable in said housing from a first position out of contact with said clutch member to a second position in which said tongue and groove means are interlocked; and an operating member mounted in said housing in a manner permitting rotation and preventing longitudinal movement therebetween, said operating member and said locking member having thread means therebetween whereby, when said operating member is rotated relative said locking member, said locking member is moved from said first to said second position, said operating member being manually rotatable relative to said housing.

3. An adjustable clutching mechanism for four wheel drive vehicles to connect a front wheel and the front axle of said front wheel which is drivable by the vehicle engine, comprising: a housing attachable to said front wheel and a clutch member positioned in said housing and secured to said front axle; said housing and said clutch member having clutching means therebetween; a shifter locking member positioned at an end of said clutch member and fixed against rotation in relation to said housing; said locking member and said end of said clutch member having interengageable locking means therebetween and said locking member being movable longitudinally of said housing from a first position out of contact with said clutch member to a second position in which said interengageable locking means are engaged locking said clutch member to said locking member; and manually operable means operative to move said locking member from said first position to said second position.

4. In a clutching mechanism for a vehicle of the type having an annular housing and a clutching member positioned in said housing having clutching means therebetween for moving said housing and clutch member together only when said clutching member is being driven in forward movement of the vehicle and a locking shifter member movable in said housing from a first position out of contact with said clutch member to a second position contacting said clutch member and said shifter member and said clutch member having interengaging means locking the same together in said second position, said shifter member having means preventing rotation in relation to said housing, the improvement, comprising: said housing being secured to a front wheel of said vehicle and said clutch member being secured to the front wheel axle, said shifter member and said housing having matching longitudinal grooves in adjacent surfaces and rods positioned in said grooves forming said means preventing rotation therebetween, said clutch member having an annular end portion having a multiplicity of parallel grooves disposed around its perimeter and said locking shifter member having a multiplicity of parallel grooves therein engageable with said grooves of said clutch member and forming said interengaging means locking the clutch and shifter members together in said second position; and manually operable means operative to move said shifter member from said first position to said second position.

5. The subject matter of claim 4 in which said manually operable means includes an operating member having threads on its exterior surface and said shifter member having an axial opening therein with threads on its interior surface engaging said threads on said operating member, said housing having an axial end opening in which one end of said operating member is positioned and said operating member having an annular flange abutting the outer surface of said housing adjacent said housing opening and a locking ring on said operating member on the inside of said housing abutting the inner surface of said housing adjacent said housing opening, said flange and ring preventing movement of said operating member longitudinally of said housing, and said operating member having means on its end surface for manual rotation of the same.

6. An adjustable clutching mechanism for four wheel drive vehicles to connect a front wheel and the front axle of said front wheel which is drivable by the vehicle engine, comprising: a housing attachable to said front wheel and a hub member rotatably positioned in said housing and secured to said front axle; a locking shifter member positioned at an end of said hub member and fixed against rotation in relation to said housing; said locking member and said hub member having interengageable tongue and groove means running longitudinally of said housing and said locking member being slidable in said housing from a first position out of contact with said hub member to a second position in which said tongue and groove means are interlocked; and an operating member mounted in said housing in a manner permitting rotation and preventing longitudinal movement therebetween, said operating member and said locking member having thread means therebetween whereby, when said operating member is rotated relative to said locking member, said locking member is moved from said first to said second position, said operating member being manually rotatable relative to said housing.

References Cited in the file of this patent

UNITED STATES PATENTS

| Number | Name | Date |
|---|---|---|
| 1,535,238 | Miller | Apr. 28, 1925 |
| 1,934,270 | Maynard | Nov. 7, 1933 |
| 2,005,389 | Pilcher | June 18, 1935 |
| 2,465,054 | Berg | Mar. 22, 1949 |